Nov. 3, 1931. H. N. SMITH 1,830,341
FRICTION BRAKE
Filed Oct. 24, 1928
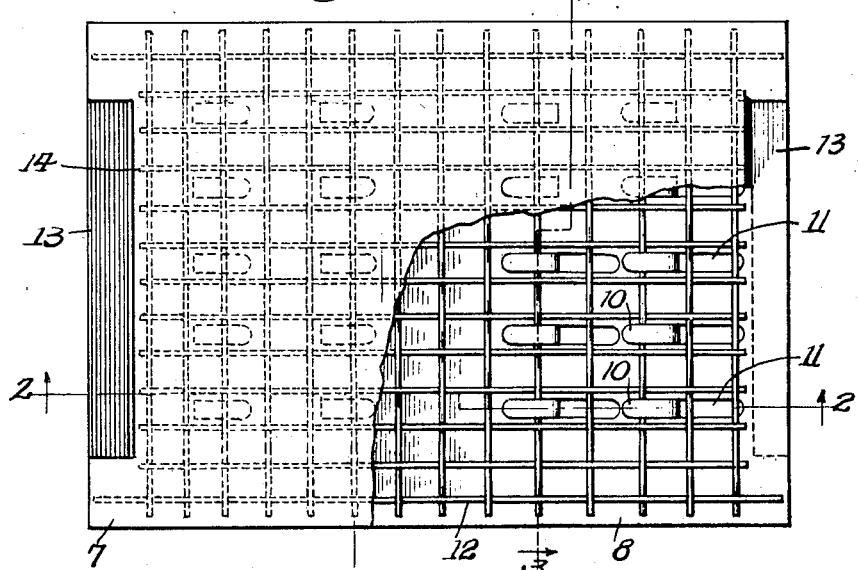
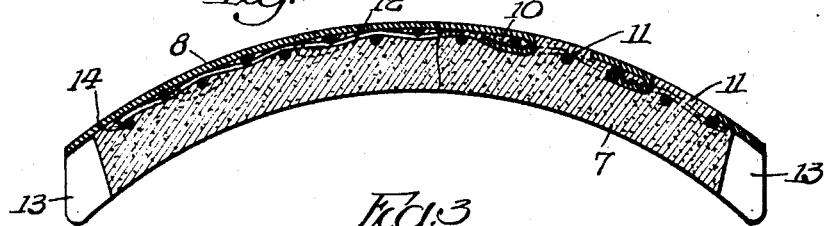
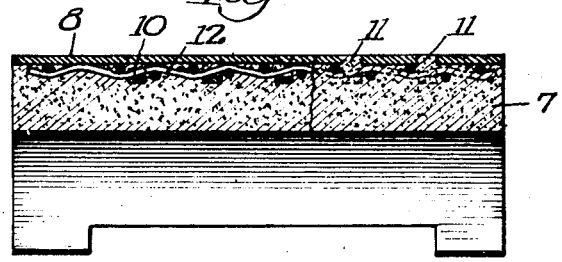
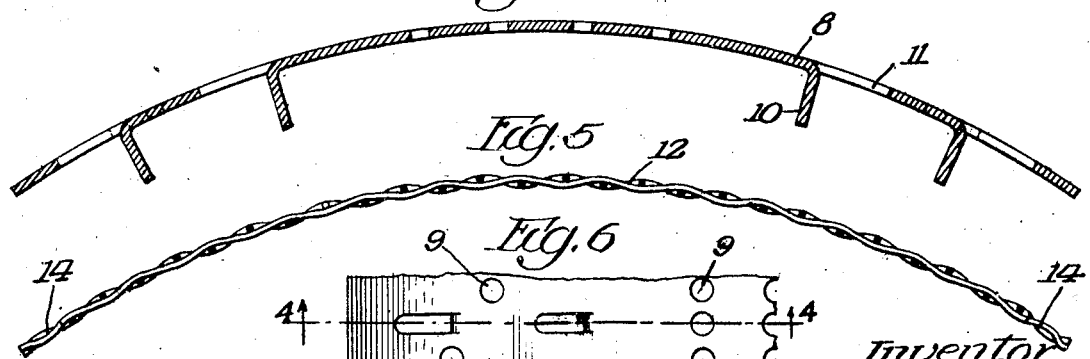
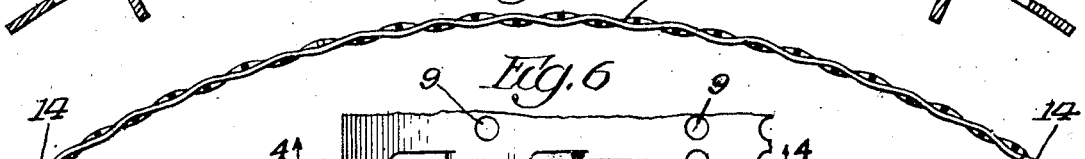
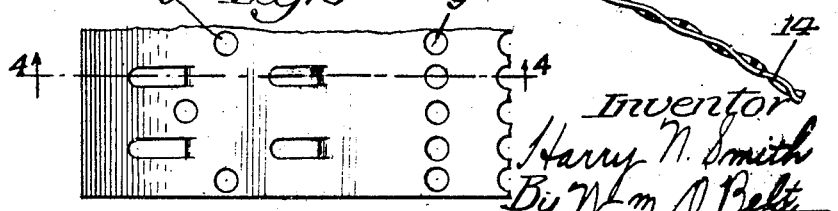
Inventor
Harry N. Smith
By Wm. O. Belt
Atty.

Patented Nov. 3, 1931

1,830,341

UNITED STATES PATENT OFFICE

HARRY N. SMITH, OF DETROIT, MICHIGAN, ASSIGNOR TO AMERICAN BRAKE MATERIALS CORPORATION, OF NEW YORK, N. Y., A CORPORATION OF NEW YORK

FRICTION BRAKE

Application filed October 24, 1928. Serial No. 314,596.

This invention relates to friction brakes, and more particularly to friction blocks having a composition body and a metal back for use on shoes or heads of internal brakes or on bands of external brakes, and otherwise in brake assemblies of different kinds.

The object of the invention is to provide a strong and substantial back for the composition body, especially for a large block intended for heavy duty work, to stand rough handling and the conditions of service.

Another object is to provide for a rigid and secure anchorage between the body and the back to prevent the body from being separated from the back under braking applications.

And a further object is to provide a brake block having a composition body securely anchored upon a strong and substantial metal back which is also used for mounting the block on its support for service.

In the accompanying drawings I have shown the invention in a selected embodiment and referring thereto;

Fig. 1 is a face view of the block with the body partly removed.

Fig. 2 is a longitudinal sectional view on line 2—2 of Fig. 1.

Fig. 3 is a transverse sectional view on line 3—3 of Fig. 1.

Fig. 4 is a longitudinal sectional view on the line 4—4 of Fig. 6.

Fig. 5 is a longitudinal sectional view of the reticulated anchoring member, and Fig. 6 is a plan view of a part of the back plate shown in Fig. 4.

The body 7 is made of suitable composition which will produce desired braking effect and also have long-wearing quality. The back plate 8 is made of sheet metal of required gauge, size and shape, and it has a plurality of openings 9, and a plurality of projecting tongues 10 stamped from the back plate and leaving elongated openings or slots 11. An anchoring member 12 is made of wire mesh or other reticulated material and it is rigidly secured to the inner side of the back plate by the tongues 10 which pass through interstices of the anchoring member and are bent down thereon (Fig. 1). The body is molded or otherwise applied on the inner side of the back plate and the anchoring member thereon. The body material fills the interstices of the anchoring member and the openings in the back plate and is rigidly and securely anchored to the back plate to withstand the conditions of service which tend to shear the body from the back. For heavy duty blocks the invention is especially desirable, and it is also advantageous in lighter blocks, especially to prevent separation of the body from the back. The ends of the body may be recessed at 13 and the ends of the anchoring member may be recessed at 14 to accommodate the devices which are employed for fastening the block to a shoe or head or band or other support, the recesses permitting direct engagement of said devices with the back; but the block may be otherwise made to accommodate fastening devices as may be required or be found desirable, and other changes in the form, construction and arrangement of parts may be made within the scope of the following claims.

I claim:

1. A brake block comprising a back plate, a reticulated anchoring member on the inner side of the back plate, tongues stamped out of the back plate in the direction of its length and oppositely engaged in the direction of their length with the anchoring member by being bent over the interstices thereof and back into engagement with the back to encircle said interstices to secure the anchoring member to the back plate against relative movement lengthwise in either direction, and a composition body mounted on the back plate and embedding the anchoring member.

2. A brake block comprising a back plate, a reticulated anchoring member on the inner side of the back plate, tongues stamped out of the back plate and engaged with the anchoring member to prevent relative movement of the back plate and anchoring member lengthwise thereof in either direction, and a composition body mounted on the back plate and embedding the anchoring member, said body and anchoring member being recessed at their ends and between their side edges to accommodate devices for engaging the back plate in said recesses to fasten the block to a support.

HARRY N. SMITH.